June 9, 1925.

R. W. MEWES

SECTIONAL PACKING RING

Filed Jan. 9, 1924

1,541,372

Witness
Lynn Latta

Inventor
Richard W. Mewes
By Bair & Freeman
Att'ys

Patented June 9, 1925.

1,541,372

UNITED STATES PATENT OFFICE.

RICHARD W. MEWES, OF DES MOINES, IOWA.

SECTIONAL PACKING RING.

Application filed January 9, 1924. Serial No. 685,155.

*To all whom it may concern:*

Be it known that I, RICHARD WATSON MEWES, a subject of the King of England, and a resident of Des Moines, in the county of Polk and State of Iowa, have invented a certain new and useful Sectional Packing Ring, of which the following is a specification.

The purpose of my invention is to provide a sectional packing ring of simple, durable and inexpensive construction.

More particularly, it is my object to provide a packing ring structure adapted for use with the cylinders of steam engines, rotary valves and the like where a water or gas tight joint is to be provided in connection with a moving member.

It is my purpose in this connection to provide a packing ring made of sections and to provide means for resiliently forcing the sections outwardly against the wall of the casing within which the movable member is mounted for thus providing a tight joint.

More particularly, in this connection, it is my purpose to provide a packing ring made in sections having adjacent beveled or inclined faces and to fit wedges between said faces and to provide means for exerting resilient outward pressure on the wedges.

A further object is to provide in such a sectional packing ring means for supporting and carrying the weight of the upper section or sections of the ring on the moving member and thus relieving the casing from such weight.

Still another object is to provide in such a structure ring sections having fractured joints.

With these and other objects in view, my invention consists in the construction, arrangement and combination of the various parts of my sectional packing ring, whereby the objects contemplated are attained, as hereinafter more fully set forth, pointed out in my claims, and illustrated in the accompanying drawings, in which:

Figure 4:
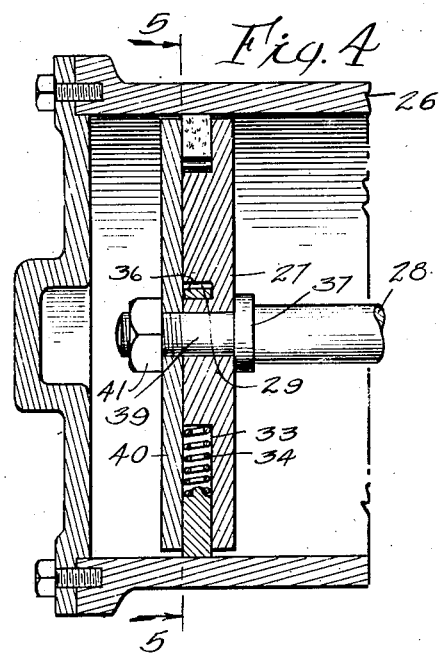
Figure 5:
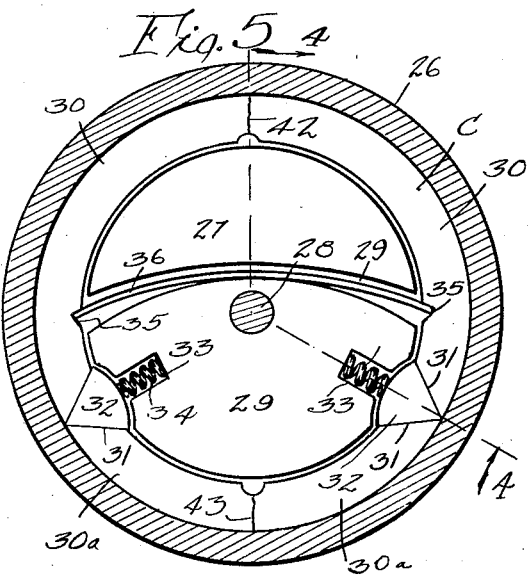

Figure 4 shows a sectional view taken on the line 4—4 of Figure 5 illustrating another form of my invention installed in connection with a horizontal cylinder or member arranged to move on a horizontal axis; and Figure 5 shows a sectional view taken on the line 5—5 of Figure 4.

Figure 1:
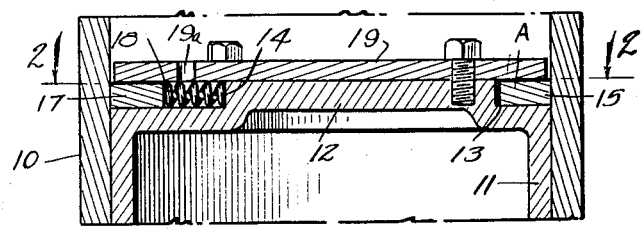
Figure 1 shows a sectional view through a cylinder and piston equipped with a sectional packing ring embodying my invention.

In Figure 1 of the drawings, I have shown my invention illustrated in connection with the parts of an automobile or other internal combustion engine.

I have used the reference numeral 10 to indicate generally the cylinder having therein the reciprocating piston 11. The piston head 12 is provided on its outer surface at its periphery with an annular rabbet 13 forming part of a ring groove.

Figure 2:
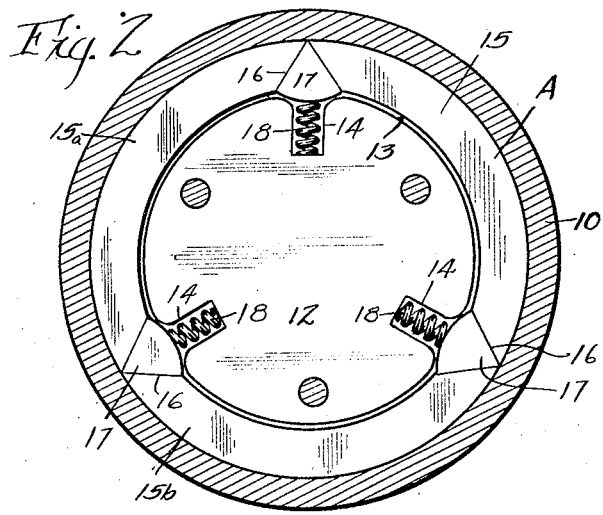
Figure 2 shows a sectional view taken on the line 2—2 of Figure 1.

At equi-distantly spaced points, grooves or slots 14 project radially inwardly from the rabbet 13 as shown in Figure 2. Received in the rabbet 13 is a packing ring A having in the form shown the three sections 15, 15$^a$ and 15$^b$.

The adjacent faces of the respective sections of the packing ring are inclined or beveled, as at 16. Received between each pair of adjacent faces is a wedge 17. The wedges 17 are arranged opposite the respective grooves 14. A spring 18 received in each groove 14 tends to press outwardly the adjacent wedge 17.

A junk ring 19 is bolted to the piston head 12 to hold the packing ring A, the wedges 17 and the springs 18 in proper position. The junk ring 19 has the openings 19$^c$ communicating with the rabbet 13, for allowing the pressure to enter behind the ring and aid in forcing the ring outwardly.

It will be seen that the springs 18 will impart such yielding, outward pressure upon the wedges 17 as to tend to force the spring sections apart and outwardly for forming a tight joint.

Figure 3:
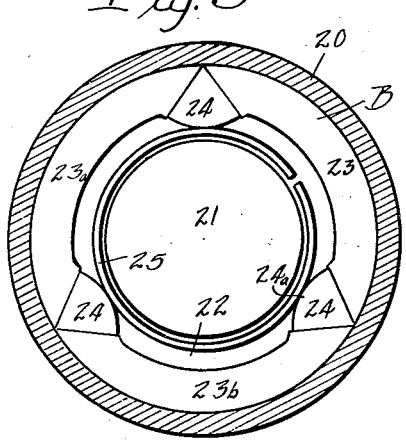
Figure 3 shows a sectional view similar to that illustrated in Figure 2 of a slightly modified form of my invention.

In Figure 3, I have shown a slightly modified form of my invention. In Figure 3, my packing ring is shown installed in a cylinder 20 adjacent to the piston head 21 having a rabbet 22 in its periphery. The packing ring B is made in three sections 23, 23$^a$ and 23$^b$, similar in construction to the sections of the packing ring A. The wedges 24 used with the packing ring B have portions 24ª, which project inwardly from the packing ring and are engaged by a common resilient, expansible bull ring 25 made of spring material. It will be understood that the packing ring B, wedges 24 and ring 25 are held in position by a junk ring similar to the junk ring 19.

In Figures 4 and 5, I have illustrated my invention in a form particularly adapted for use with pistons, rotary valves or the like operating upon horizontal axes.

In these figures I have shown portions of a cylinder 26, in which travels a piston 27. The piston rod 28 may be extended through the piston 27.

I provide in the form of invention herein disclosed a sectional packing ring C preferably made of two sections 30 and 30ª.

In the form of invention now under consideration, the section 30 may extend more than half way around the interior of the cylinder 26. The sections 30 and 30ª have the inclined adjacent faces 31 similar to the faces 16. Between the adjacent faces 31 are wedges 32. In the piston are recesses or the like 33 in which are received springs 34 bearing against the wedges 32, as shown in Figures 4 ond 5.

I now come to one of the important features of my invention. It is well known that in the use of the horizontally reciprocating piston or horizontally mounted rotary valve, the weight of the packing ring or rings used in connection therewith is really supported by the enclosing casing, such for instance as the cylinder or valve casing.

As result, there is, of course, greater wear on the lower part of the cylinder than upon the upper part, due to the weight of the packing ring and the imposition thereon upon the lower part of the casing.

It is my purpose to provide a simple structure for supporting the weight of a substantial portion at least of the packing ring on the movable member, such as the piston 27, rather than to allow it to rest on the casing.

The inner face or edge of the section 30 has notches 35 below the level of the piston rod 28. In the face of the piston is a curved groove 29, the ends of which register with the notches 35 and the center of which is bowed upwardly. A strong spring 36, which may be of the flat type, has its ends received in the notches 35 and its central portion resting on the hump of the groove 29 in such manner as to exert pressure on the section 30 for supporting the weight of said section on the piston and for holding the section upwardly for securing a tight joint.

The piston rod 28 has a flange 37 adjacent to the piston 27 and a reduced portion 39 extending through the piston. A plate 40 is mounted on the reduced portion 39 and held in position by a nut 41 screwed onto the reduced portion 39.

I find that I get better results in some cases by breaking or fracturing the sections 30 and 30ª and leaving fractured joints 42 and 43, which, of course, fit very snugly together. These joints I find seem to permit the sections to wear to a steam-tight joint more quickly and satisfactorily than can be done where such joints are not provided.

It will be seen from the foregoing, that I have provided a structure which will accomplish the objects heretofore set forth.

The piston ring made in sections forms a steam or gas-tight joint at all points in the periphery of the ring and the joints is maintained by outward pressure on the wedges.

I have also provided a means for supporting the weight of the packing ring or a substantial part thereof on the piston or other movable member rather than on the cylinder, and this structure causes less wear on the interior of the cylinder, and causes more even wear than where the weight of the ring is on the lower part of the interior of the cylinder.

The chief advantage of my ring lies in its long wearing qualities. The ordinary expansion ring must be made thin in order to gain resilience. By the time it is well worn in so as to make a perfect fit in the cylinder, it has lost so much of its thickness that it will not last very much longer. My ring may be made thick enough to last the life of the engine.

The wedges are cut from the same material as the ring and will wear down at the point in unison with the remainder of the ring.

It will be seen that as the ring wears down, the wedges will gradually move outwardly compensating in their increased width at the periphery of the ring, for the decreased length of the ring sections, and thus maintaining an unbroken packing around the piston. In the ordinary ring, the expansion caused by wear will open the slot between the ends of the ring.

Some changes may be made in the construction and arrangement of the parts of my improved device without departing from the spirit and purpose of my invention, and it is my intention to cover by my claims, any modified forms of structure or use of mechanical equivalents, which may be reasonably included within their scope.

I claim as my invention:

1. In a device of the class described, a casing element having a horizontal base, a sliding member therein having a peripheral groove, and a groove extending across one face, communicating at its ends with the first groove, a packing ring structure comprising a resilient plural segment ring received in said first groove, provided with notches as shown and a spring in the second groove having its ends received in said notches, for thus supporting the weight of the upper part of the ring on the sliding member and exerting resilient outward pressure thereon substantially as described.

2. In a device of the class described, a casing element having a horizontal base, a sliding member therein having a peripheral groove, and a groove extending across one face, communicating at its ends with the first groove, a packing ring structure comprising a resilient plural segment ring received in said first groove, provided with notches as shown and a spring in the second groove having its ends received in said notches, for thus supporting the weight of the upper part of the ring on the sliding member and exerting resilient outward pressure thereon substantially as described.

3. In a device of the class described, a casing having a horizontal bore, a sliding member therein having a peripheral rabbet and a groove extending across one face communicating at its ends with said first groove, a packing ring structure comprising a resilient plural segment ring received in said first groove, provided with notches as shown and a spring in the second groove having its ends received in said notches for thus supporting the weight of the upper part of the ring on the sliding member and exerting resilient outward pressure thereon substantially as described, and a plate adjacent to the grooved face of the sliding member and secured to said sliding member.

Des Moines, Iowa, November 26, 1923.

RICHARD W. MEWES.